(12) United States Patent
Griffin et al.

(10) Patent No.: US 8,619,041 B2
(45) Date of Patent: Dec. 31, 2013

(54) PORTABLE ELECTRONIC DEVICE AND METHOD OF CONTROLLING SAME

(75) Inventors: Jason T. Griffin, Kitchener (CA); Todd Wood, Guelph (CA); Mihal Lazaridis, Waterloo (CA); Harry Richmond Major, Waterloo (CA); David Paul Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1224 days.

(21) Appl. No.: 12/246,807

(22) Filed: Oct. 7, 2008

(65) Prior Publication Data

US 2010/0087228 A1 Apr. 8, 2010

(51) Int. Cl.
*G06F 3/041* (2006.01)
*G09G 5/00* (2006.01)
*H04M 1/00* (2006.01)

(52) U.S. Cl.
USPC .......................... 345/173; 455/566; 345/684

(58) Field of Classification Search
USPC .......................................... 345/173; 488/566
See application file for complete search history.

(56) References Cited

U.S. PATENT DOCUMENTS

| | | | |
|---|---|---|---|
| 5,528,260 A * | 6/1996 | Kent ............................. | 345/684 |
| 5,760,773 A * | 6/1998 | Berman et al. ................ | 715/808 |
| 7,479,949 B2 * | 1/2009 | Jobs et al. ..................... | 345/173 |
| 7,643,012 B2 * | 1/2010 | Kim et al. ..................... | 345/173 |
| 2004/0119763 A1 * | 6/2004 | Mizobuchi et al. ........... | 345/863 |
| 2005/0076300 A1 * | 4/2005 | Martinez ....................... | 715/539 |
| 2006/0109259 A1 | 5/2006 | Ohta | |
| 2007/0075976 A1 * | 4/2007 | Kun et al. ...................... | 345/172 |
| 2007/0150826 A1 * | 6/2007 | Anzures et al. ............... | 715/772 |
| 2007/0229471 A1 * | 10/2007 | Kim et al. ..................... | 345/173 |
| 2008/0055869 A1 * | 3/2008 | Hsiung .......................... | 361/752 |
| 2009/0228842 A1 * | 9/2009 | Westerman et al. .......... | 715/863 |
| 2011/0039602 A1 * | 2/2011 | McNamara et al. .......... | 455/566 |
| 2011/0105193 A1 * | 5/2011 | Lee et al. ...................... | 455/566 |

FOREIGN PATENT DOCUMENTS

| | | |
|---|---|---|
| EP | 1548552 A1 | 6/2005 |
| EP | 1564631 A1 | 8/2005 |

OTHER PUBLICATIONS

European Patent Application No. 08166047.4: search report dated Mar. 24, 2009.
Touchscreen User Manual, Zytronic X-Y Controller (Serial and USB)—issue 1, Nov. 17, 2006, XP007916436.
Summons to Attend Oral Proceedings issued on Jan. 28, 2011, in respect of corresponding European Patent Application No. 08166047.4.

* cited by examiner

*Primary Examiner* — Bipin Shalwala
*Assistant Examiner* — Benyam Ketema
(74) *Attorney, Agent, or Firm* — Geoffrey deKleine; Borden Ladner Gervais LLP (57) ABSTRACT

A method of controlling a portable electronic device that has a touch screen display includes providing a graphical user interface including an area defined by a boundary, detecting a touch event at a touch location within the area defined by the boundary on the touch screen display, determining if the touch location has moved to a new location outside of the area defined by the boundary; and performing an action in response to detecting the touch event at the touch location within the area defined by the boundary and determining that the touch location has moved from the area defined by the boundary to the new location outside of the area defined by the boundary.

21 Claims, 8 Drawing Sheets

PORTABLE ELECTRONIC DEVICE AND METHOD OF CONTROLLING SAME

FIELD OF TECHNOLOGY

The present disclosure relates to portable electronic devices including touch screen display devices and the control of such devices for user interaction.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such handheld devices as such handheld devices are small and are therefore limited in space available for user input and output devices. Further, the screen content on the touch screen display devices can be modified depending on the functions and operations being performed. Even still, these devices have a limited area for rendering content on the touch screen display and for rendering features or icons, for example, for user interaction. With continued demand for decreased size of portable electronic devices, touch screen displays continue to decrease in size.

Improvements in touch screen devices are therefore desirable.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device including a touch screen display and control of the portable electronic device. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 1:
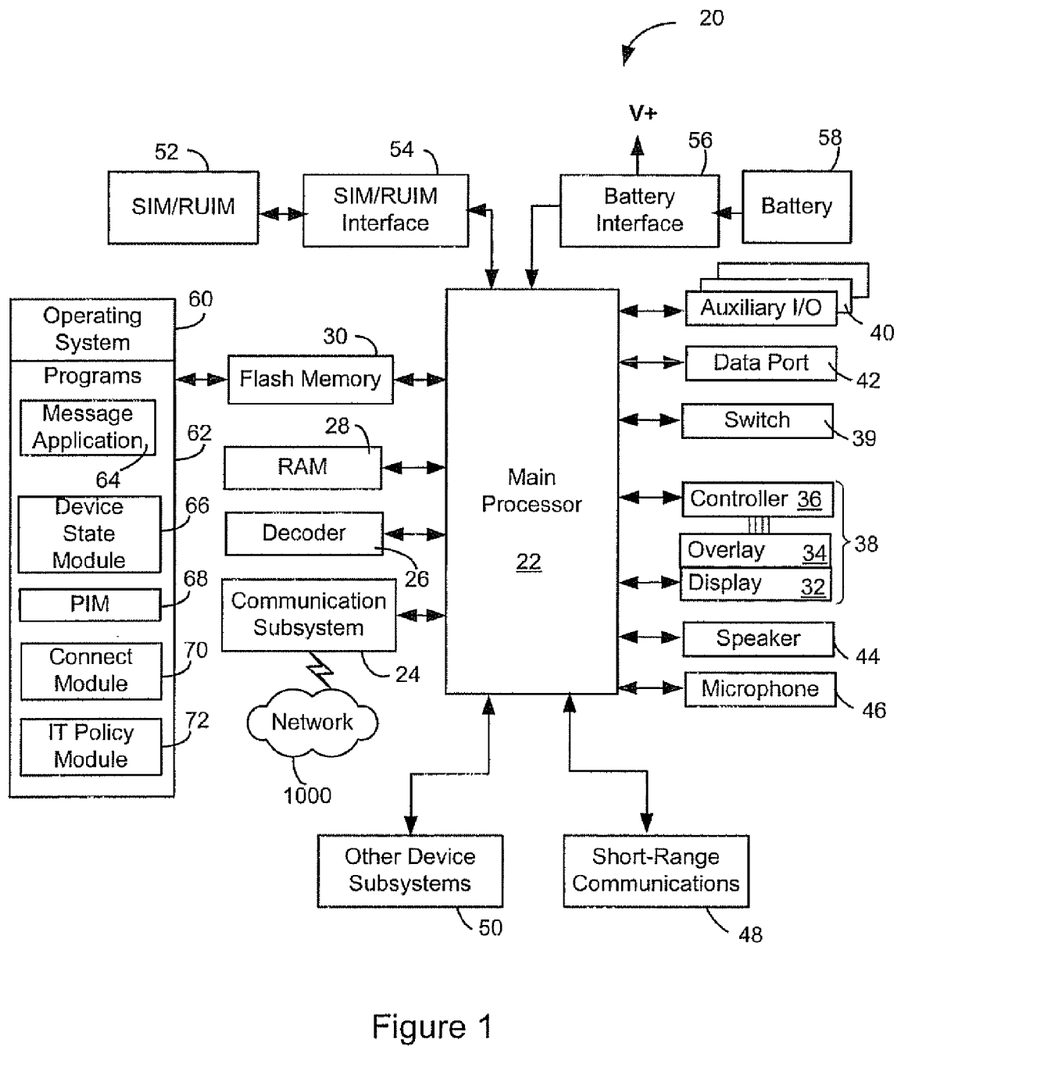
FIG. 1 is a block diagram of a portable electronic device according to one example.

Referring first to FIG. 1, there is shown therein a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 22 also interacts with additional subsystems such as a Random Access Memory (RAM) 28, a flash memory 30, a display 32 with a touch-sensitive overlay 34 connected to an electronic controller 36 that together make up a touch screen display 38, a switch 39, an auxiliary input/output (I/O) subsystem 40, a data port 42, a speaker 44, a microphone 46, short-range communications 48 and other device subsystems 50. The touch-sensitive overlay 34 and the electronic controller 36 provide a touch-sensitive input device and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The portable electronic device 20 can send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 to 72 which are described in more detail below. The operating system 60 and the software components 62 to 72 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62 to 72, such as specific device applications, or parts thereof, may be temporarily loaded into a volatile store such as the RAM 28. Other software components can also be included, as is well known to those skilled in the art.

The subset of software applications 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. A PIM application has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 40. A subscriber may also compose data items, such as e-mail messages, for example, using the touch-sensitive overlay 34 on the display 32 that are part of the touch screen display 38, and possibly the auxiliary I/O subsystem 40. The auxiliary I/O subsystem 40 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
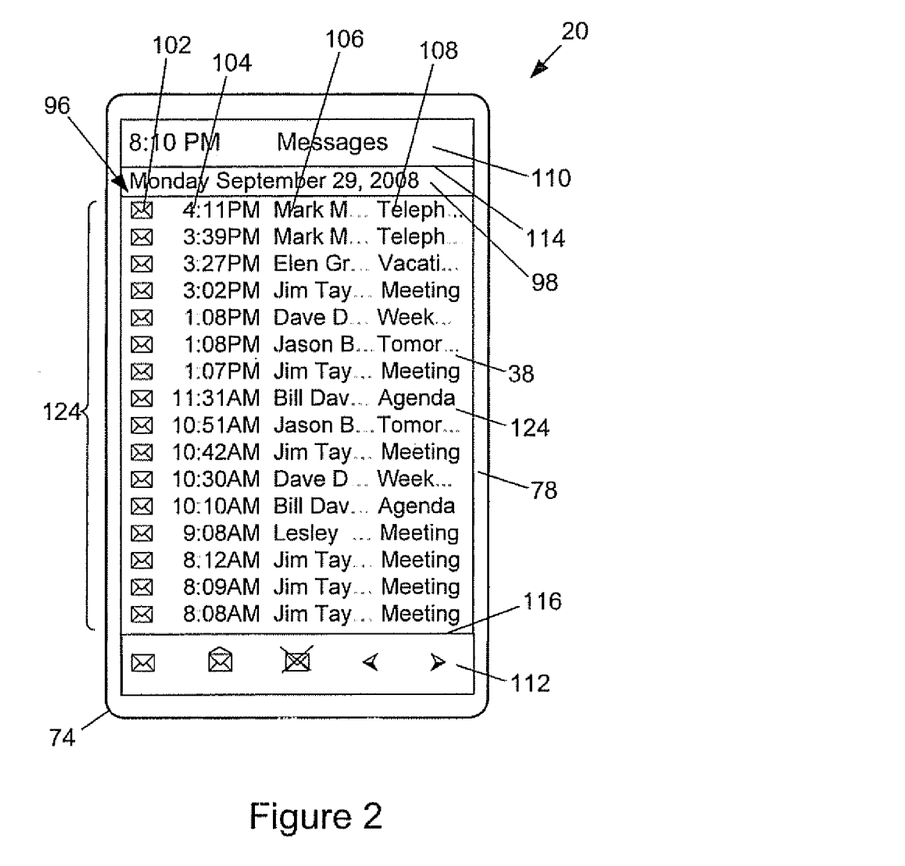
FIG. 2 is a front view of an exemplary portable electronic shown in a portrait orientation.

Reference is now made to FIG. 2, which shows a front view of an exemplary portable electronic device 20 in portrait orientation. The portable electronic device 20 includes a housing 74 that houses the internal components that are shown in FIG. 1 and frames the touch screen display 38 such that the touch screen display 38 is exposed for user-interaction therewith when the portable electronic device 20 is in use.

Figure 3:
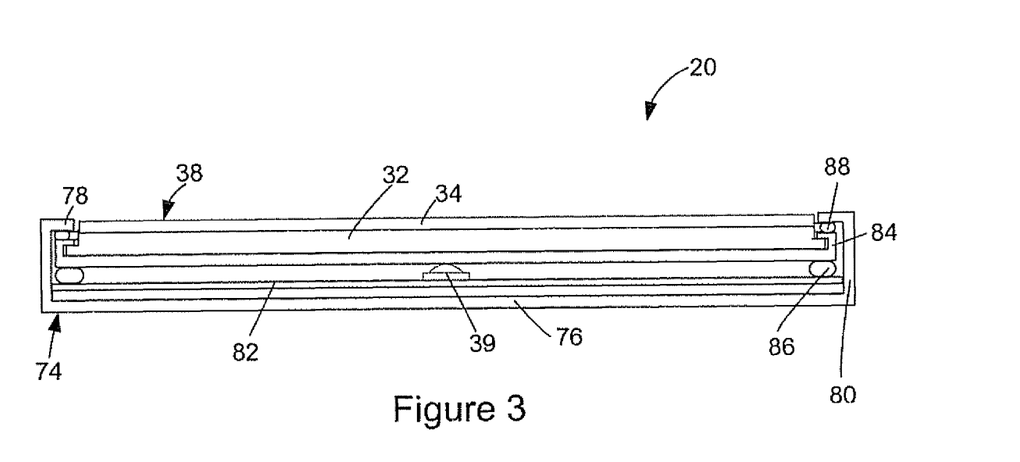
FIG. 3 is a simplified sectional side view of the portable electronic device of FIG. 2 (not to scale), with a switch shown in a rest position.

As best shown in FIG. 3, the housing 74 includes a back 76, a frame 78, which frames the touch-sensitive display 38, sidewalls 80 that extend between and generally perpendicular to the back 76 and the frame 78, and a base 82 that is spaced from and generally parallel to the back 76. The base 82 can be any suitable base and can include, for example, a printed circuit board or flex circuit board. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the exemplary portable electronic device 20 shown in FIG. 2, the frame 78 is generally rectangular with rounded corners although other shapes are possible.

The display 32 and the touch-sensitive overlay 34 can be supported on a support tray 84 of suitable material such as magnesium for providing mechanical support to the display 32 and touch-sensitive overlay 34. The display 32 and touch-sensitive overlay 34 are biased away from the base 82, toward the frame 78 by biasing elements 86 such as gel pads between the support tray 84 and the base 82. Compliant spacers 88, which can also be in the form of gel pads for example, are located between an upper portion of the support tray 84 and the frame 78. The touch screen display 38 is moveable within the housing 74 as the touch screen display 38 can be moved toward the base 82, thereby compressing the biasing elements 86. The touch screen display 38 can also be pivoted within the housing 74 with one side of the touch screen display 38 moving toward the base 82, thereby compressing the biasing elements 86 on the same side of the touch screen display 38 that moves toward the base 82.

In the present example, the switch 39 is supported on one side of the base 82 which can be printed circuit board while the opposing side provides mechanical support and electrical connection for other components (not shown) of the portable electronic device 20. The switch 39 can be located between the base 82 and the support tray 84. The switch 39, which can be a mechanical dome-type switch, for example, can be located in any suitable position such that displacement of the touch screen display 38 resulting from a user pressing the touch screen display 38 with sufficient force to overcome the bias and to overcome the actuation force for the switch 39, depresses and actuates the switch 39. In the present embodiment the switch 39 is in contact with the support tray 84. Thus, depression of the touch screen display 38 by user application of a force thereto, causes actuation of the switch 39, thereby providing the user with a positive tactile quality during user interaction with the user interface of the portable electronic device 20. The switch 39 is not actuated in the rest position shown in FIG. 3, absent applied force by the user. It will be appreciated that the switch 39 can be actuated by pressing anywhere on the touch screen display 38 to cause movement of the touch screen display 38 in the form of movement parallel with the base 82 or pivoting of one side of the touch screen display 38 toward the base 82. The switch 39 is connected to the processor 22 and can be used for further input to the processor when actuated. Although a single switch is shown any suitable number of switches can be used.

In the exemplary screen shown in FIG. 2, the touch screen display 38 includes a list of messages 96 sent from the portable electronic device 20 and received at the portable electronic device 20. The list of messages 96 can include any suitable message types such as email messages, Short Message Service (SMS) messages, Multimedia Messaging Service (MMS) messages, Personal Identification Number (PIN messages), and any other suitable message types as well as any combination of message types. In the present example, the list is in time and date order and includes a date field 98 under which all messages sent and received on the date indicated in the date field 98 are listed. Each message in the list of messages 96 sent and received includes a number of fields for identification. These fields can include, for example, a message type field 102, a time field 104, a correspondent field 106, and a subject field 108. It will be appreciated that other suitable information fields are possible as further suitable fields can be included in the list of messages or suitable fields can be excluded from the list of messages 96. Regardless of the fields included, the list of messages can be provided in the message application 64, for example, upon execution of the message application 64 resulting from receipt of a user-selection of, for example, the message application 64 from a menu list of selectable applications.

The touch screen display 38 can be any suitable touch screen display such as a capacitive touch screen display. A capacitive touch screen display 38 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 38 can be determined. For example, the size and the shape of the touch on the touch screen display 38 can be determined in addition to the location (X and Y values) based on the signals received at the controller 36 from the touch sensor layers.

Referring still to FIG. 2, it will be appreciated that a user's touch on the touch screen display 38 is determined by determining the X and Y touch location and user-selected input is determined based on the X and Y touch location and the application executed by the processor 22. In the exemplary screen shown in the view of FIG. 2, the application provides the list of messages 96 and each message in the list can be selected for opening for viewing content, for example, by touching on the touch screen display 38. Thus, the message is selectable by the user based on the X and Y touch location and the application. In the example shown in FIG. 2.

The top and the bottom of the list of messages 96 as shown in the portrait orientation in FIG. 2, are both bounded by other fields which may include user-selectable features such as icons or other suitable features. In the present example, the top of the list of messages 96 is bounded by a banner 110. The banner in this example includes the time "8:10 PM" and the name of the application "Messages". The bottom of the list of messages is bounded by a shortcut bar 112 which includes user-selectable icons for selection, for example, for composing a message, opening a selected message, deleting a message, replying to a message, forwarding a message or any other suitable action.

Thus, a top boundary 114 is provided at the top of the list of messages 96, when the portable electronic device 20 is in the portrait orientation as shown in FIG. 2, where the list of messages 96 meets the banner 110. Similarly, a bottom boundary 116 is provided at the bottom of the list of messages 96, when the portable electronic device 20 is in the portrait orientation as shown in FIG. 2 where the list of messages 96 meets the shortcut bar 112.

Figure 4:
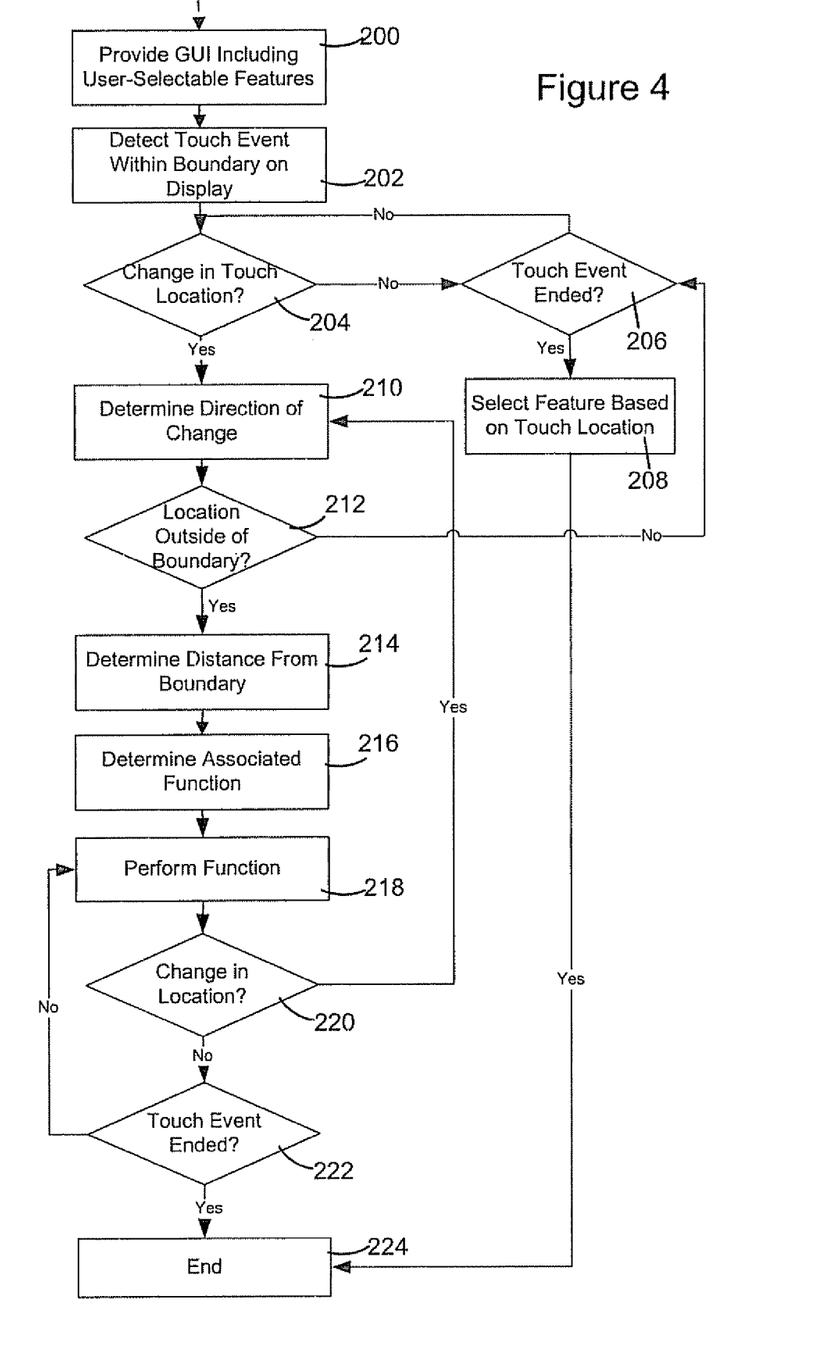
FIG. 4 is a flow chart showing a method for controlling an electronic device according to an embodiment.

Reference is now made to FIG. 4 to describe a method of controlling a portable electronic device in accordance with one embodiment. It will be appreciated that the steps of FIG. 4 can be carried out by routines or subroutines of software executed by the processor 22. Coding of software for carrying out such steps is well within the scope of a person of ordinary skill in the art having regard to the present description.

In general, the method of controlling the portable electronic device 20 having the touch screen display 38 includes providing a graphical user interface including an area defined by a boundary, detecting a touch event at a touch location within the area defined by the boundary on the touch screen display 38, determining if the touch location has moved to a new location outside of the area defined by the boundary, and performing an action in response to determining that the touch location has moved from the area defined by the boundary to the new location outside of the area defined by the boundary.

A graphical user interface is displayed on the display 32 and includes an area 124 on the touch screen display defined by a boundary (step 200). The area 124 includes a list of user-selectable features such as a list of messages, a list of contacts, a list of calendar events or any other suitable list and is defined by a boundary where the rendered list terminates at an edge of the display 32 or other feature such as a banner, a button bar, icons, an other area, or a combination of these. The graphical user interface can be provided in any suitable application, such as the message application 64 or any other suitable application.

A touch event is detected upon user touching of the touch screen display 38. Such a touch event can be determined upon a user touch at the touch screen display 38 for selection of, for example, one of the features in the list, such as a message or other feature of for scrolling in the list. Signals are sent from the touch-sensitive overlay 34 to the controller 36 when a suitable object such as a finger or other conductive object held in the bare hand of a user, is detected. Thus, the touch event is detected and the X and Y location of the touch are determined. The X and Y location of the touch are determined to fall within the area 124 defined by the boundary on the touch screen display 38 (step 202).

Next it is determined if there is a change in the location of touch (step 204). The X and Y location of touch is determined and compared to the first determined X and Y location from step 202 and any change in the X and Y location is determined. If there is no change in the X and Y location of the touch, or a change that is below a minimum threshold, it is determined if the touch event has ended (step 206). If the touch event has not ended, the process returns to step 204 where it is determined if the location of touch has changed. The location of the touch is thereby monitored to determine any changes during the touch event. If, at step 206, it is determined that the touch event has ended, the feature in the list that corresponds to the X and Y location of touch immediately prior to the end of the touch event is selected (step 208). Thus, for example, the feature in the list can be selected for displaying further details such as further message details for a list of messages, further contact details for a list of contacts or further calendar event details for a list of calendar events.

If, on the other hand, it is determined at step 204 that there is a change in the location of the touch, the direction of change is then determined based on the X and Y location determined at step 202 and the new X and Y location of touch (step 210). It is also determined if the new location of touch is outside of the area 124 defined by the boundary on the touch screen display 38 (step 212). If the new location of touch is not outside the boundary, the process proceeds to step 206 where it is again determined if the touch event has ended (step 206) and, if not, the process returns to step 204 where it is again determined if the location of touch has changed. Again, the location of the touch is determined to detect any changes in location during the touch event. If, at step 206, it is determined that the touch event has ended, the feature in the list that corresponds to the X and Y location of the touch immediately prior to the end of the touch event is selected (step 208).

If, however, it is determined at step 212 that the new location of touch is outside of the area 124 defined by the boundary on the touch screen display 38 based on the X and Y values of the location of touch after the change, the distance from the boundary is determined by determining the distance from the boundary to the location of touch based on the X and Y values (step 214).

The associated function is then determined based on the direction of change as determined at step 210 (step 216). The associated function can be a scrolling function that is dependent on the direction of the change. The direction of change can determine the direction of scrolling for scrolling up in the list, scrolling down in the list, scrolling left or scrolling right.

To scroll down, for example, the screen rendered on the display 32 is again rendered with each feature in the list moved upwardly in the screen and an additional feature added to the bottom of the list. The function can also be determined based on the distance from the boundary as determined at step 214. For example, the distance from the boundary can determine a delay time for rendering the scrolled screen such that a shorter delay time results from movement of the location of touch to a location farther from the boundary. Thus, at step 218, the scrolling direction is determined along with a delay time. After the determined delay time, the scrolling is performed.

After performing the associated function, it is determined if there is another change in the location of touch (step 220). The X and Y location of the touch is again determined and compared to the previous X and Y location values and any change in the X and Y location is determined. If there is a change in location of the touch, the process returns to step 210 where the direction of change is determined based on the X and Y location determined previously at step 202 and the new X and Y location of the touch (step 210). Thus, the direction of change is determined based on the original location of touch and the location of touch resulting from the change in location determined at step 220.

If, on the other hand, there is no change in the X and Y location of the touch, or a change that is below a minimum threshold, it is determined if the touch event has ended (step 222). If, at step 222, it is determined that the touch event has ended, the process ends at step 224. If, on the other hand, the touch event has not ended and touch contact is maintained, the process returns to step 218 and the function is again performed as scrolling is performed with the delay time as described above. It will now be understood that with maintained contact with the touch screen display 38 at a location of touch outside the boundary results in continued scrolling and the speed of scrolling depends on the delay time which is determined based on the distance from boundary to the location of touch outside the area 124 defined by the boundary.

It will be appreciated that the process shown and described with reference to FIG. 4 is simplified for the purpose of the present explanation and other steps and substeps may be included. Alternatively, some of the steps and substeps may be excluded. For example, the function performed may be independent of distance of the location of touch to the boundary. Thus, the distance from the boundary need not be determined.

Figure 5:
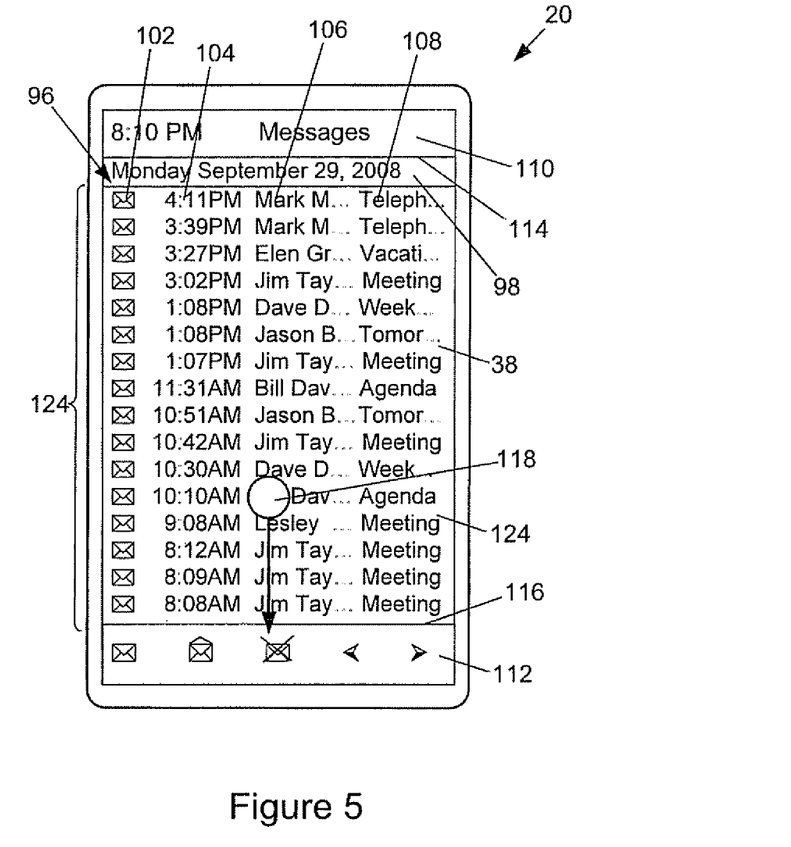
FIGS. 5 and 6 are front views of the exemplary portable electronic device of FIG. 2 depicting GUIs for user interaction.
Figure 6:
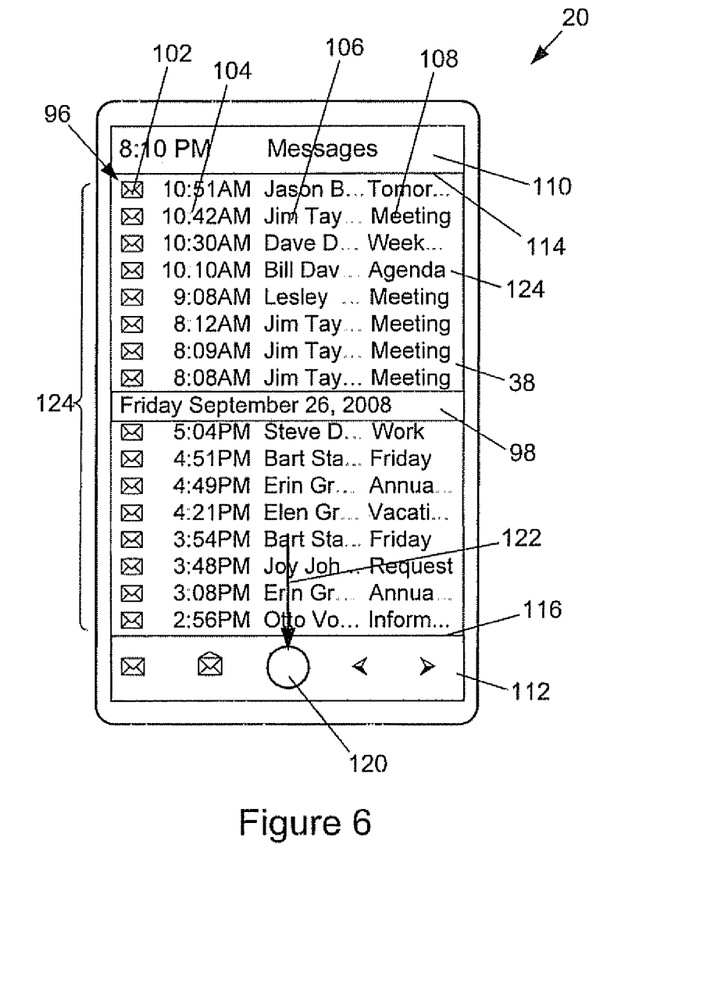

Continued reference is made to FIG. 4 to describe an example of the method of controlling the electronic device, with reference also to FIGS. 2, 5 and 6, which show front views of the exemplary portable electronic device 20 with a GUI. In the present embodiment, the touch screen display 38 is a capacitive touch screen display 38 as described above. As shown, the GUI provides the list of user-selectable features in the form of messages and each message in the list of messages 96 can be selected for opening for viewing content, for example, by touching on the touch screen display 38 (step 200). The top and the bottom of the list of messages 96 as shown in the portrait orientation in FIG. 2, are both bounded by other fields which, in the present example, include the banner 110 and the shortcut bar 112.

A touch event is detected upon user touching of the touch screen display 38. Thus, signals are sent from the touch-sensitive overlay 34 to the controller 36 and the X and Y location of the touch are determined (step 202). For the purpose of the present example, the location of touch is determined to be within the area 124 that includes the list of messages and is defined by the boundary where the banner 110 meets the list of messages 96 and where the shortcut bar 112 meets the list of messages 96. In the present example, the location of touch can be determined to be at the location indicated by the numeral 118 as shown in FIG. 5.

Next it is determined that there is a change in the location of touch (step 204). It will be appreciated that the change in touch location is determined as a result of a user dragging his or her finger over the touch screen display 38 while maintaining touch contact. The new X and Y location of the touch is determined and compared to the first determined X and Y location from step 202 and the direction of change in the X and Y location is determined (step 210). In the present example, the portable electronic device 20 can be controlled for scrolling the list of messages 96 upwardly and downwardly.

It is also determined that the new location of touch is outside of the area 124 defined by the boundary on the touch screen display 38 (step 212). The new location of touch can be determined to be at the location indicated by the numeral 120 as shown in FIG. 6. The distance from the boundary 116 to the new location of touch is determined based on the X and Y values (step 214).

The associated function is then determined based on the direction of change as determined at step 210 and based on the distance from the boundary as determined at step 214 (step 216). In the present example, the direction of change is determined to be in the direction indicated by the arrow 122 in FIG. 6. The associated function is a scrolling function for scrolling down in the list of messages 96 with a delay time based on the distance of the location of touch to the boundary.

After the delay time, a new screen is rendered on the display 32 with each message in the list of messages 96 moved upwardly in the screen and an additional feature added to the bottom of the list as shown in FIG. 6.

After performing the associated function, it is determined if there is another change in the location of touch (step 220). The X and Y location of the touch is again determined and compared to the previous X and Y location values and any change in the X and Y location is determined. If there is a change in location of the touch, the process returns to step 210 as described above. If, on the other hand, there is no change in the X and Y location of the touch, or a change that is below a minimum threshold, it is determined if the touch event has ended (step 222). If, at step 222, it is determined that the touch event has ended, the process ends at step 224. If, on the other hand, the touch event has not ended and touch contact is maintained, the process returns to step 218 and the function is again performed as scrolling is performed with the delay time as described above. As the touch contact is maintained at the location of touch outside the boundary 116, the portable electronic device therefore continues to scroll through the list of messages 96 and the speed of scrolling depends on the delay time which is determined based on the distance from boundary 116 to the new location of touch 120.

In another example, the user can scroll upwardly in the list of messages 96.

In other embodiments, the portable electronic device 20 can be controlled for scrolling side to side in a list. In one example, the touch screen 38 can include a list such as the list of messages with suitable fields. One of the fields can be incomplete or not shown in the GUI as a result of screen size and display font size for example. Thus at least a portion of a field is cut off in the rendered GUI. In addition to top and bottom boundaries, the sides can include respective suitable boundaries for scrolling side to side in the method as described with reference to FIG. 4. Further, the present disclosure is not limited to a list of messages as the present method can be carried out in any suitable application.

A touch event beginning at the area 124 defined by the boundary and ending outside the area 124 defined by the boundary is thereby distinguished from a touch event that begins outside the boundary. For example, an area outside the boundary can include user-selectable icons or other selectable features. Such features can be separately selected, for example, upon detection of a touch event beginning and ending at the feature.

Figure 7:
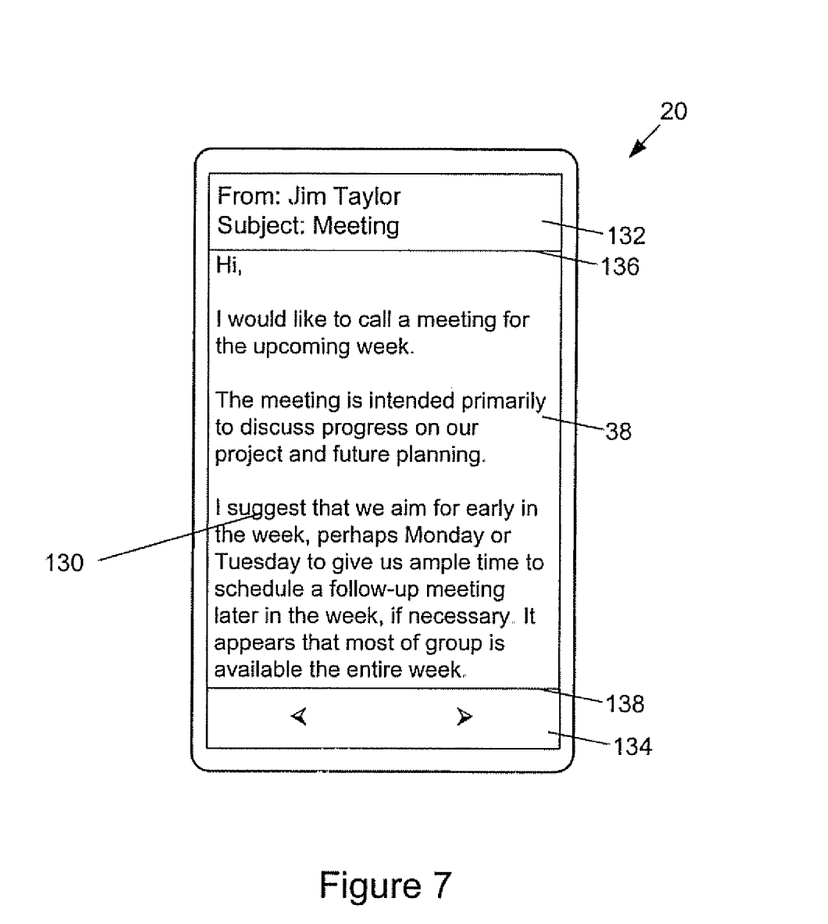
FIG. 7 is a front view of the exemplary portable electronic device depicting another GUI for user interaction.

Reference is now made to FIG. 7 which shows a front view of the exemplary portable electronic device 20 with another GUI for user interaction. In the present example, the GUI provides a message that is opened for reading content. Thus, an area 130 is provided for displaying the message content. The top and bottom of the message content area 130 in the orientation shown in FIG. 7 are bounded by a message detail banner 132 showing the correspondent and the subject and a message content shortcut bar 134. Thus, the area 130 is defined by the boundary 136 where the message detail banner 132 meets the area 130 and by the boundary 138 where the shortcut bar 134 meets the area.

A touch event can again be detected upon user touching of the touch screen display 38 and the steps of the method of controlling the electronic device 20 can again be carried out with the present GUI. Thus, the user can scroll through the message content and the speed of scrolling depends on the delay time which is determined based on the distance from the boundary 136 or the boundary 138 to the new location of touch.

Figure 8:
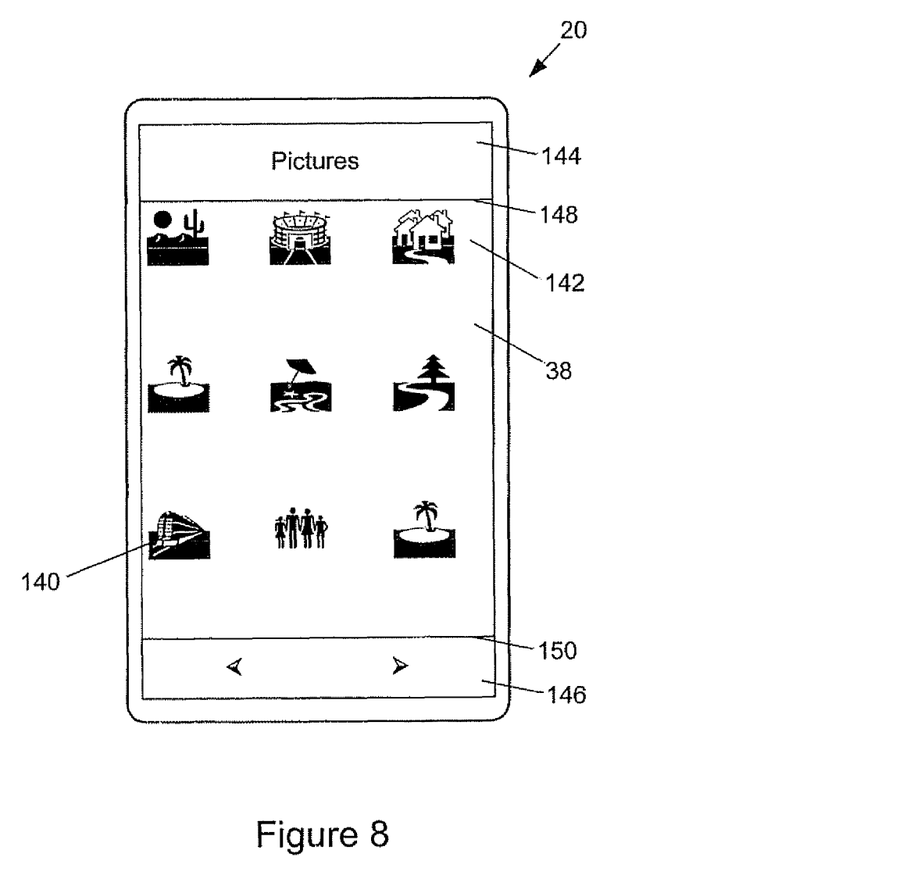
FIG. 8 is a front view of an exemplary portable electronic device showing yet another GUI for user interaction.

Reference is now made to FIG. 8 which shows a front view of the exemplary portable electronic device 20 with yet another GUI for user interaction. In the present example, the GUI is provided in a picture viewing application for exemplary purposes and provides a plurality of selectable thumbnail images for viewing. Thus, an area 142 is provided in which the thumbnail images 140 are displayed for selection. The top and bottom of the area 142 in the orientation shown in FIG. 8 are bounded by a picture banner 144 a shortcut bar 146. Thus, the area 142 is defined by the boundary 148 where the picture banner 144 meets the area 142 and by the boundary 150 where the shortcut bar 146 meets the area 146.

A touch event can again be detected upon user touching of the touch screen display 38 and the steps of the method of controlling the electronic device 20 such as those shown in FIG. 4 can again be carried out with the present GUI. Thus, the user can scroll through the thumbnail images 140 and the speed of scrolling depends on the delay time which is determined based on the distance from the boundary 148 or the boundary 150 to the new location of touch.

According to one aspect there is provided a method of controlling a portable electronic device that has a touch screen display. The method includes providing a graphical user interface including an area defined by a boundary, detecting a touch event at a touch location within the area defined by the boundary on the touch screen display, determining if the touch location has moved to a new location outside of the area defined by the boundary; and rendering a new screen within the area defined by the boundary in response to determining that the touch location has moved from the area defined by the boundary to the new location outside of the area defined by the boundary.

According to another aspect there is provided a portable electronic device. The portable electronic device includes a touch screen display and function components. The functional components include a processor connected to the touch screen display, and a memory device for storage of computer-readable program code executable by the processor for providing a graphical user interface including an area defined by a boundary, detecting a touch event at a touch location within the area defined by the boundary on the touch screen display, determining if the touch location has moved to a new location outside of the area defined by the boundary, and rendering a new screen within the area defined by the boundary in response to determining that the touch location has moved from the area defined by the boundary to the new location outside of the area defined by the boundary.

According to another aspect, there is provided a computer-readable medium. The computer-readable medium has computer-readable code embodied therein for execution by a processor for providing a graphical user interface on a touch screen display, the graphical user interface including an area defined by a boundary, detecting a touch event at a touch location within the area defined by the boundary on the touch screen display, determining if the touch location has moved to a new location outside of the area defined by the boundary, and rendering a new screen within the area defined by the boundary in response to determining that the touch location has moved from the area defined by the boundary to the new location outside of the area defined by the boundary.

Scrolling through a list can be carried out based on the initial location of touch and based on the direction of change of the touch. Further, the scrolling speed can be controlled based on the distance of the touch event from the list boundary. This scrolling can be performed without any additional icons or menus rendered on the display. Thus, a greater area of the display can be used for the list of messages as no further icons or menus are necessary. Furthermore, menu screens or pop-up windows need not be rendered, reducing the number of screens for rendering for user interaction. Further still, additional devices such as a scroll wheel, trackball or buttons are not required for scrolling.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

The invention claimed is:

1. A method comprising:
   displaying, on a touch screen display of a portable electronic device, an area of an application including a boundary, wherein the boundary separates displayed data from displayed selectable features;
   detecting a touch event at a touch location within the area;
   determining when touch contact is maintained and the touch event moves to a new location outside of the area; and
   performing an action in response to detecting that the touch event moved to the new location.

2. The method according to claim 1, wherein performing the action comprises displaying different information within the area.

3. The method according to claim 1, comprising determining a direction of change of the touch contact, and displaying different information based on the direction of change.

4. The method according to claim 1, wherein performing the action comprises scrolling based on the direction of change of the touch contact.

5. The method according to claim 1, comprising determining when the touch event moves prior to determining when the touch event moves to a new location outside of the area and, when the touch event ends absent the touch event having moved, selecting a feature in the area based on the touch location.

6. The method according to claim 1, comprising determining when the touch event moves to a further new location outside of the area, displaying different information within the area.

7. The method according to claim 1, wherein performing the action comprises scrolling.

8. The method according to claim 7, comprising further scrolling while touch contact is maintained at the location outside the area.

9. The method according to claim 7, wherein a speed of the scrolling is based on a distance of the new touch location from the boundary.

10. The method according to claim 7, wherein a speed of the scrolling increases with distance of the new touch location from the boundary.

11. The method according to claim 7, comprising determining a distance from the new location to the boundary and determining a delay time based on the distance prior to scrolling.

12. The method according to claim 11, wherein the delay time decreases with an increase in the distance to increase a scrolling speed.

13. A portable electronic device comprising:
    a touch screen display;
    a processor coupled to the touch screen display and configured to:
    display, on the touch screen display, an area defined by a boundary, wherein the boundary separates displayed data from displayed selectable features,
    detect a touch event at a touch location within the area on the touch screen display,
    determine when touch contact is maintained and the touch event moves to a new location outside of the area, and
    perform an action in response to detecting that the touch contact event moved to the new location.

14. A non-transitory computer-readable device having computer-readable code embodied therein and executable by a processor to perform the method of claim 1.

15. The method according to claim 1, wherein the displayed data comprises data from the application and the displayed selectable features comprise icons from the application.

16. A method comprising:
    providing a graphical user interface for an application on a touch screen display of a portable electronic device, wherein the graphical user interface includes a first area of the application and a second area of the application, wherein the first area has a boundary that separates displayed data in the first area from selectable features displayed in the second area;
    detecting a touch event at a touch location within the first area on the touch screen display;
    determining when touch contact is maintained and the touch event moves to a new location outside the first area, wherein the new location is within the second area;
    performing an action in response to detecting that the touch event moved to the new location.

17. The method according to claim 16, wherein a selectable feature is separately selectable upon detection of a touch event beginning and ending at the selectable feature.

18. The method according to claim 16, wherein performing the action comprises scrolling in a direction dependent on a direction of change of the touch contact within the first area and the second area.

19. The method according to claim 16, wherein a speed of the scrolling is based on a distance of the new touch location from the boundary.

20. A method comprising:
   displaying, on a touch screen display of a portable electronic device, a first area of the application and a second area of the application, wherein the first area has a boundary that separates displayed data in the first area from selectable features displayed in the second area;
   detecting a touch event at a touch location within the first area on the touch screen display;
   determining when touch contact is maintained and the touch event moves to a new location outside the first area, wherein the new location is within the second area;
   scrolling the displayed data in the first area in response to detecting that the touch event moved to the new location.

21. The method according to claim 20, wherein a direction of scrolling is dependent on a direction of movement of the touch event to the new location and the speed of scrolling is based on a distance of the new location from the boundary.

* * * * *